United States Patent
Leheup et al.

(10) Patent No.: US 10,395,013 B2
(45) Date of Patent: *Aug. 27, 2019

(54) METHOD AND DEVICE FOR ENHANCING THE PROTECTION OF A SIGNAL, IN PARTICULAR A MULTIMEDIA SIGNAL, AGAINST A MALICIOUS ATTACK

(71) Applicant: STMicroelectronics SA, Montrouge (FR)

(72) Inventors: Jocelyn Leheup, Asnieres-sur-Seine (FR); Herve Sibert, San Francisco, CA (US)

(73) Assignee: STMicroelectronics SA, Montrouge (FR)

( * ) Notice: Subject to any disclaimer, the term of this patent is extended or adjusted under 35 U.S.C. 154(b) by 120 days.

This patent is subject to a terminal disclaimer.

(21) Appl. No.: 15/390,850

(22) Filed: Dec. 27, 2016

(65) Prior Publication Data
US 2017/0329941 A1 Nov. 16, 2017

(30) Foreign Application Priority Data
May 11, 2016 (FR) ..................................... 16 54197

(51) Int. Cl.
| | | |
|---|---|---|
| *G06F 21/00* | (2013.01) | |
| *G06F 21/16* | (2013.01) | |
| *G06F 21/57* | (2013.01) | |
| *G06F 21/44* | (2013.01) | |
| *G06F 21/84* | (2013.01) | |
| *H04N 21/4363* | (2011.01) | |
| *H04N 21/4367* | (2011.01) | |

(Continued)

(52) U.S. Cl.
CPC .............. *G06F 21/16* (2013.01); *G06F 21/44* (2013.01); *G06F 21/57* (2013.01); *G06F 21/84* (2013.01); *H04L 63/1441* (2013.01); *H04N 21/4367* (2013.01); *H04N 21/43635* (2013.01); *G06F 21/10* (2013.01); *G06F 2221/034* (2013.01); *G06F 2221/0733* (2013.01); *G06F 2221/2105* (2013.01)

(58) Field of Classification Search
CPC ....... G06F 21/554; G06F 21/55; G06F 21/577
See application file for complete search history.

(56) References Cited

U.S. PATENT DOCUMENTS

| | | |
|---|---|---|
| 9,152,798 B1 | 10/2015 | Drewry et al. |
| 2006/0069926 A1 | 3/2006 | Ginter et al. |
| 2011/0099255 A1 | 4/2011 | Srinivasan et al. |

(Continued)

FOREIGN PATENT DOCUMENTS

| | | |
|---|---|---|
| EP | 2698736 A2 | 2/2004 |
| EP | 2804123 A1 | 11/2014 |
| WO | WO-2004021700 A1 | 3/2004 |

OTHER PUBLICATIONS

INPI Search Report and Written Opinion for FR 1654197 dated Nov. 18, 2016 (8 pages).

*Primary Examiner* — Ghazal B Shehni
(74) *Attorney, Agent, or Firm* — Crowe & Dunlevy

(57) ABSTRACT

A signal is protected against an attack by an enhancement process that checks the conformity of an actual state of the signal with respect to an expected state. A protective action is exercised on the signal if the actual state of the signal is not in conformity with the expected state, so as to neutralize or nullify said attack.

15 Claims, 2 Drawing Sheets

(51) Int. Cl.
*H04L 29/06* (2006.01)
*G06F 21/10* (2013.01)

(56) References Cited

U.S. PATENT DOCUMENTS

| | | |
|---|---|---|
| 2012/0151580 A1* | 6/2012 | Chae .................... G06F 21/554 |
| | | 726/22 |
| 2012/0173877 A1 | 7/2012 | Pendakur et al. |
| 2012/0278869 A1 | 11/2012 | Guccione et al. |
| 2014/0095918 A1 | 4/2014 | Stahl et al. |
| 2014/0143798 A1 | 5/2014 | Marino |
| 2014/0233732 A1 | 8/2014 | Buere et al. |
| 2016/0070887 A1 | 3/2016 | Wu et al. |
| 2016/0255051 A1 | 9/2016 | Williams et al. |
| 2017/0105171 A1 | 4/2017 | Srivastava et al. |
| 2017/0201541 A1 | 7/2017 | Kapoor et al. |

\* cited by examiner

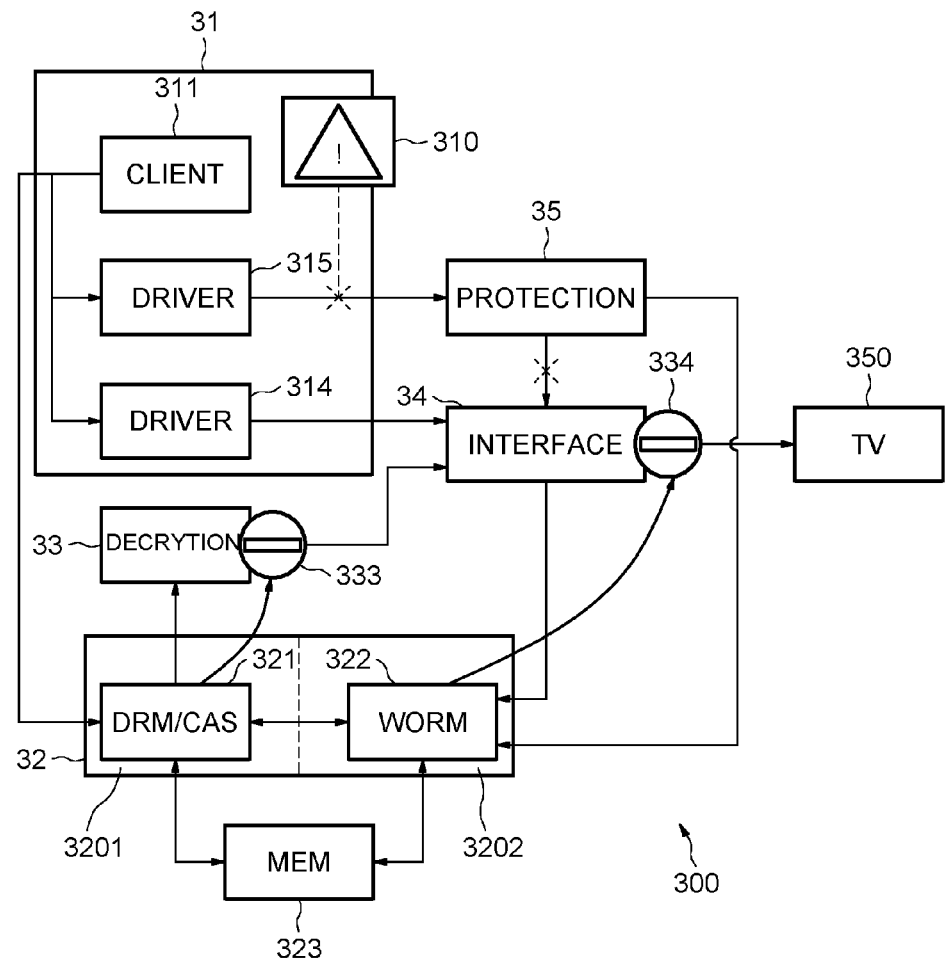
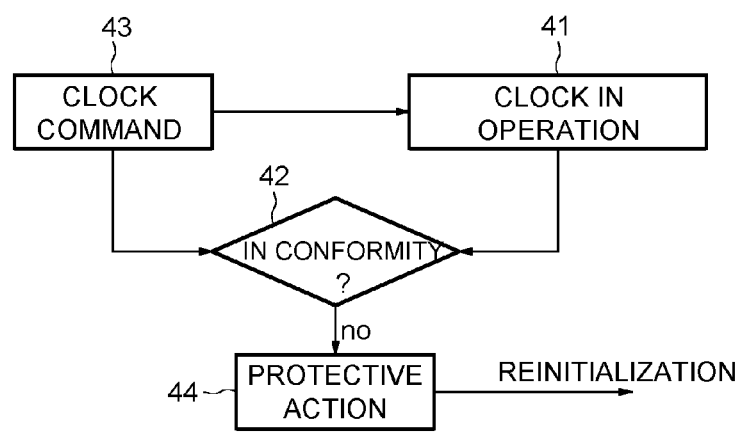

METHOD AND DEVICE FOR ENHANCING THE PROTECTION OF A SIGNAL, IN PARTICULAR A MULTIMEDIA SIGNAL, AGAINST A MALICIOUS ATTACK

PRIORITY CLAIM

This application claims the priority benefit of French patent application number 1654197, filed on May 11, 2016, the disclosure of which is hereby incorporated by reference in its entirety.

TECHNICAL FIELD

Embodiments and implementations of the invention relate to the protection of digital systems and signals against malicious attacks, for example, in the context of digital rights management and conditional access systems.

BACKGROUND

"On-demand" online services are increasingly common and present on multiple media, such as personal computers, television decoders connected to the Internet, mobile phones or tablets.

But these services need to be protected against users or malware seeking to illicitly exploit the data provided by these services, in particular in the field of on-demand videos or pay television.

Technical protection measures are therefore implemented to control the use made of digital works. For example, a Conditional Access System (CAS) is generally set up as part of a broadcast of video and audio content, or multimedia content.

In a CAS process, the multimedia content is encrypted by servers thanks to a symmetric key and the broadcast content is accessible only to clients holding said key.

On the other hand, notably in the context of downloading a data stream ("Streaming") or a massive download of data, Digital Rights Management (DRM) systems are deployed.

In a DRM process, a client sends a server an identification key which is specific to it. If this client is authorized to access the content, the server encodes a content key thanks to the identification key and transmits the encoded content key to the authorized client which is the only one able to decode it. The encrypted multimedia content is then transmitted to the client which can decrypt it thanks to the decoded content key.

The encryption-decryption processes are implemented by encryption-decryption means, generally formed by autonomous and secure hardware blocks. The encryption-decryption means are controlled and managed by Digital Rights Management DRM means and Conditional Access CAS means, subsequently referred to as "DRM/CAS means".

The DRM/CAS means may be implemented in a secure area (TEE for "Trusted Execution Environment") of a computing system of the electronic medium, which is generally the main processor.

The TEE makes it possible notably to reliably execute secure software, termed reliable applications, by having a computing capacity and an average allocated secure memory. Computing systems generally comprise a physically secure element (SE for Secure Element) with little computing capacity but excellent security. Conversely, computing systems comprise an area allocated to an operating system (REE, for "Rich Execution Environment") with large resources but little security and therefore very exposed to outside attacks.

On the other hand, protection for multimedia output interfaces has been developed, and is notably required by the services of multimedia content providers. For example, a version of HDCP protection may be required on an HDMI or DVI digital video and audio output interface.

Protection for analog video and audio outputs also exists, such as CGMS-A or "Macrovision". Transcoding protection may be required, notably the DTCP protocol in WiFi wireless communication. Digital watermarking protection may further be required, consisting in incorporating in the multimedia content a mark invisible to human beings but traceable by machine.

The application of the multimedia output interface protection required and the delivery of a multimedia signal on a multimedia output interface are generally controlled by respective drivers from the REE.

The means for implementing said multimedia output interface protection, termed the protection means, and the delivery means, termed the multimedia output interface, are generally formed by autonomous and secure hardware blocks.

Faced with the diversification of media able to benefit from multimedia services protected by CAS and DRM, and therefore with the diversification of risks of fraud, it is desirable that electronic systems on chips (SoC for "System on Chip") that implement these services are robust to malicious attacks, notably regarding multimedia interface protection.

In this regard, it might be possible to migrate the control and engagement of outgoing multimedia interface protection into a TEE secure zone. But this requires that the TEE has a sufficiently large computing capacity for directly controlling the multimedia interface protection, and migration of such systems is very demanding technologically. Indeed, many existing hardware blocks, each providing a function established and designed in a given technological sector, would undergo heavy modifications or even new designs.

To overcome these constraints, simple embodiments and implementations of enhancing the protection of a signal against a malicious attack are provided, for example, in multimedia device audio/video outputs, by monitoring the state of this signal, for example, the state of a multimedia output interface protection, and by exercising a "punitive" action if the signal exhibits an irregularity, for example, if the multimedia output interfaces are not properly protected.

A punitive action is, for example, a protective action for neutralizing or nullifying such a malicious attack on the signal.

SUMMARY

According to one aspect, a method of protecting a signal against an attack is provided including a monitoring step comprising a check of the conformity of an actual state of the signal with an expected state, and, if the actual state of the signal is not in conformity with the expected state, an application of a protective action on said signal, so as to neutralize or nullify said attack.

According to one implementation, the signal includes an outgoing multimedia data stream delivered at the end of a decryption of an incoming encrypted data stream and an application of a multimedia interface protection, the expected state of said signal checked for conformity being a state in which the multimedia interface protection is applied to said signal.

Thus, the protection drivers may remain completely or partially located outside the TEE, the protection required on the multimedia output interfaces may then be engaged from the REE, while benefiting from increased protection.

The protective action may include stopping the decryption of the incoming encrypted data stream and/or stopping the delivery of the outgoing data stream.

Advantageously, the monitoring step also includes a check of an active or inactive state of the delivery of the outgoing data stream.

The multimedia interface protection may include digital or analog video output protection, and/or digital or analog audio output protection, and/or digital watermarking, and/or digital transcoding protection.

According to another aspect provision is also made for a computer program product directly loadable into a memory of a computer system, including portions of software code for executing a method of protection as defined above when said program is executed on said computer system.

According to another aspect provision is also made for a medium readable by a computer system, having instructions executable by computer suitable for causing the execution by the computer system of a method of protection as defined above.

According to another aspect, provision is made for a device for protecting a signal against an attack including an enhancement means configured for checking the conformity of an actual state of the signal with respect to an expected state, and for exercising a protective action on said signal if the actual state of the signal is not in conformity with the expected state, so as to neutralize or nullify said attack.

According to one embodiment, the device includes a decryption means configured for decrypting an incoming encrypted data stream, a multimedia output interface configured for delivering an outgoing data stream in a multimedia interface format, and a protection means configured for applying a multimedia interface protection on said outgoing data stream, said signal being the outgoing data stream on which the multimedia interface protection is applied, the enhancement means being configured for checking the conformity of the actual state of the multimedia interface protection with an active expected state of said protection.

The enhancement means may be configured for exercising a protective action including stopping the decryption of the incoming encrypted data stream and/or stopping the transmission of said outgoing data stream.

The enhancement means may be configured for reading the active or inactive state of the multimedia interface protection in a status register of the protection means.

Advantageously, the enhancement means is also configured for checking an active or inactive state of the delivery of the signal.

Said active or inactive state of the delivery of the signal may be read in a status register of the multimedia output interface.

For example, the multimedia interface protection may include digital or analog video output protection, and/or digital or analog audio output protection, and/or digital watermarking, and/or digital transcoding protection.

Advantageously, the enhancement means is incorporated into at least one secure area of at least one microprocessor.

According to another aspect, a multimedia reader system capable of reading a multimedia data stream is provided, comprising a device previously described.

When all or part of the multimedia reader system is incorporated in a system on chip (SoC: "System on Chip"), another possible protective action may be a reinitialization of the system on chip.

The multimedia reader system may form or be included in a television decoder, or a personal computer, a mobile phone, or a tablet.

Thus, the implementations and embodiments previously described provide a simple solution for improving the protection of digital works, for example, in a system having multimedia interface protection drivers in an unprotected area of a computing system.

Consequently, the constraint of high computing power of a TEE secure area for effecting control is avoided.

On the other hand, the solution provided may easily be applied to functional blocks for which no protection was originally developed.

Moreover, this solution is compatible with future rules for tightening the security of DRM/CAS systems without major modification of the system on chip implementing them.

BRIEF DESCRIPTION OF THE DRAWINGS

Other advantages and features of the invention will appear in the detailed description of implementations and embodiments, in no way restrictive, and from the attached drawings in which:

FIG. 3 shows an embodiment of a signal protection device in a multimedia reader system; and FIG. 4 shows application of the process with respect to a clock signal of an electronic system.

DETAILED DESCRIPTION OF THE DRAWINGS

Figure 1:
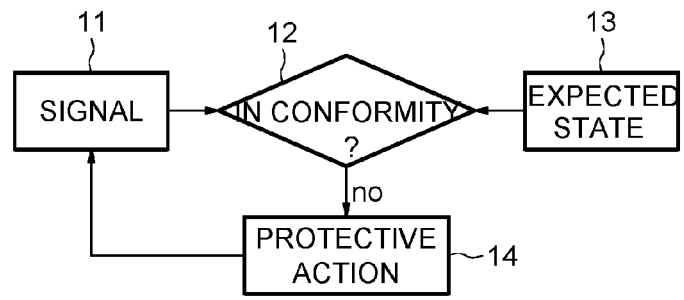
FIG. 1 represents a functional diagram for signal processing.

FIG. 1 represents a functional diagram of a general implementation of the invention.

A signal 11, which may be hacked or modified, for example, by malware, is checked during a monitoring step 12. During this monitoring step 12, a check is made on whether the actual state of the signal 11 is in conformity with an expected state 13. In other words, in the monitoring step 12, it is verified whether the signal 11 corresponds to what it would be if it had been generated normally, without hacking or modification.

If the state of the signal 11 is not in conformity with the expected state 13, then a "punitive" or protective action 14 is engaged on the signal 11. The objective of the punitive action 14 is, for example, to stop hacking or to render it devoid of interest.

The invention may be applied to any type of signal, in order to enhance existing protection, or to provide protection as such. The invention has the advantages of being simple to implement and of being adaptable to any type of system.

Figure 2:
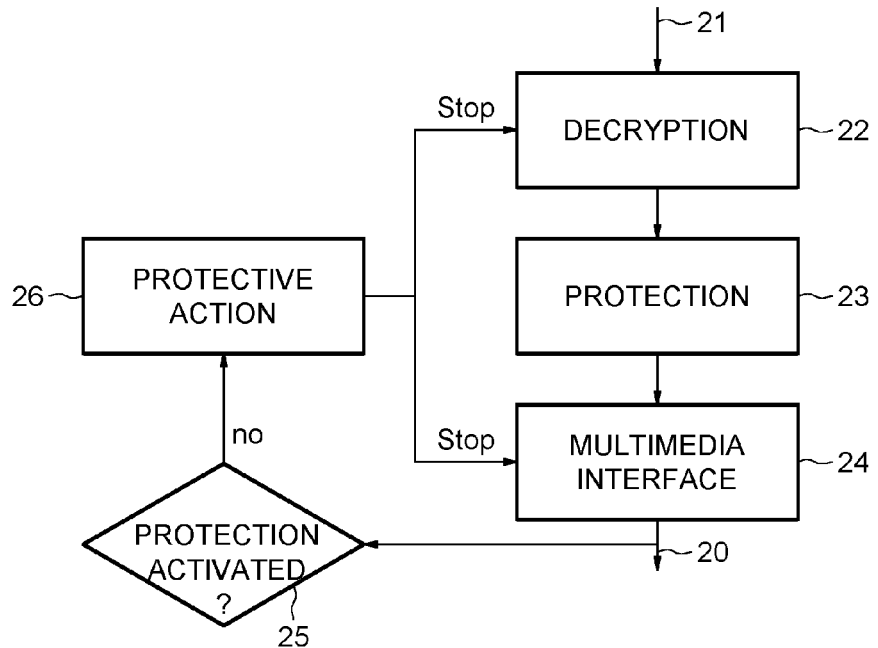
FIG. 2 is a flow diagram for a process applied to the delivery of multimedia data.

FIG. 2 represents an implementation of the invention applied to the delivery of multimedia data.

In this implementation, the signal 20 is an outgoing multimedia data stream delivered by a multimedia interface 24, for example, HDMI. These data are derived from a decryption 22 of encrypted data 21, in a multimedia interface format supporting a protection 23, for example, HDCP for an HDMI transfer.

Multimedia output interface protection protocols are well known to the person skilled in the art and may, for example, be of the HDCP, CGMS-A, DTCP or digital watermarking type.

Malicious attacks may potentially succeed in deactivating the multimedia interface protection 23, for example, in order to illicitly abstract the multimedia content.

This is why it is advantageous to enhance the multimedia interface protection normally applied to the signal 20. Thus, during the monitoring step 25, it is verified whether a multimedia interface protection is applied to the signal 20, in accordance with the expected state during a normal implementation. Moreover, in this step, it is also checked whether or not the multimedia output(s) are delivering a data stream.

If the result of the monitoring step 25 shows that the protection is not activated, then a "punitive" action 26 is exercised on the signal 20. In this implementation, it is possible to reach the signal 20 at different stages of its processing.

For example, it is possible to stop the decryption step 22, the outgoing data stream will then be a garbled and therefore unusable stream.

It is also possible to stop step 24 of delivering the signal 20 by the multimedia output interface, and the method thus prevents the delivery of a multimedia data stream not supporting the required multimedia interface protection.

FIG. 3 more precisely represents an embodiment of a signal protection device, in a multimedia reader system 300. The multimedia reader system is capable of reading a multimedia data stream, for example, as part of an on-demand video or pay television service. For example, this type of system may be an electronic system on chip forming or being included in a television decoder, a personal computer, a mobile phone, a tablet or any other system capable of reading multimedia content.

The system 300 comprises a computing element, such as a microprocessor, for example, comprising a secure area (TEE) 32 and an area allocated to the operating system (REE) 31.

Digital Rights Management and Conditional Access processing (DRM/CAS) 321 and a monitoring processing 322 (WORM in the figure, for "Watermark and Output Restriction Monitor") are incorporated in the TEE 32.

As represented in FIG. 3, the DRM/CAS processing 321 and the monitoring processing 322 may be incorporated into separate TEEs, 3201 and 3202 respectively. In this case, they share a secure memory 323 notably in order to be able to communicate with each other. For example, the TEE 3201 may be a secure area of the main processor and the TEE 3202 may be a secure area of a graphics processor. The secure shared memory 323 may be formed by an autonomous hardware block or by a region of secure memory allocated to this function.

As will be seen in further detail later, the DRM/CAS 321 and monitoring 322 together form an example of an enhancement processing configured for checking the conformity of an actual state of the multimedia signal with respect to an expected state, and for exercising a protective action on said signal if the actual state of the signal is not in conformity with the expected state, so as to neutralize or nullify said attack.

The system 300 also comprises a decryption processing 33, as well as a multimedia output interface 34, generally formed by independent and secure hardware blocks, and a protection circuit 35 also generally formed by an independent hardware block.

The multimedia output interface 34 and the protection circuit 35 are controlled by respective drivers 314 and 315 of the REE 31.

For reading multimedia content by the system 300 required by a "client" 311 (for example, the client is an on-demand video program of a television decoder connected to the Internet) of the REE 31: the DRM/CAS 321 verifies whether the client 311 is authorized to access the multimedia content. If the client is authorized, the DRM/CAS 321 engages the decryption of the received data by the decryption processing 33, the decrypted data then being transmitted to the multimedia output interface 34.

In the case of an HDMI multimedia output interface and an HDCP2.2 multimedia interface protection, as soon as the client 311 of the REE so requires, the protection driver 315 negotiates a session key with the connected device 350 (generally a television display) in the course of a step of authentication and key exchange.

The protection driver 315 transmits the session key to the protection circuit 35 and orders the activation of an encryption of the outgoing multimedia stream delivered by the multimedia output interface 34, for example, in a dedicated register of the protection circuit 35.

The encryption is, for example, implemented notably by means of a secret key and an exclusive-OR gate between the multimedia data stream and the session key, generally forming an AES (for "Advanced Encryption Standard") encryption.

Consequently, from the REE, it is possible that a malicious attack 310 may succeed in blocking the encryption command issued by the protection system driver 315 and that consequently the multimedia data stream is not protected by the output interface protection, and is then vulnerable to fraudulent use.

According to one embodiment, the monitoring processing 322 monitors the state of the signal delivered by the multimedia output interface 34.

In this regard, the monitoring processing 322 at random intervals reads the active or inactive states of the transmission of the outgoing stream on the multimedia output interface 34, and the active or inactive state of the multimedia interface protection 35 on the outgoing multimedia data stream.

The active or inactive state of the multimedia interface protection may be read in a status register of the protection circuit 35, and the active or inactive state of the delivery of a signal may be read in a status register of the multimedia output interface 34.

The monitoring processing 322 may simultaneously read the states of digital and/or analogue audio and/or video signals on multiple multimedia output interfaces.

The results of these monitoring actions are directly transmitted, or reported, to the DRM/CAS 321. In the case where the monitoring processing 322 and the DRM/CAS 321 are located in two separate TEEs 3201, 3202, the results of these checks are reported via the secure shared memory 323.

The DRM/CAS 321 check that the multimedia interface protection is in conformity with the active expected state of said protection for all the multimedia output interfaces reported active, i.e. delivering a multimedia data stream.

If an authorized multimedia output interface subject to protection is reported active but its protection state is reported inactive by the monitoring processing 322, then the DRM/CAS 321 exercise a punitive action 333 of suspension of the decryption 33 of the received data.

The punitive action generally includes an action for neutralizing the malicious attack, or nullifying it, according to the capabilities of the TEE 32 or TEEs 3201 and 3202 and, more generally, of the system 300.

This embodiment is advantageous notably in the case where the secure area TEE 32 allocated to the DRM/CAS 321 is capable of performing a continuous check, for example, by checking the conformity of the state of the signal at regular intervals of performing decryptions.

This corresponds notably to a DRM application in a context of a temporary downward multimedia data stream, for example, in an on-demand "streaming" video service.

According to another advantageous embodiment notably in the case where the DRM/CAS 321 are not capable of performing a continuous check, the DRM/CAS 321 indicate directly, or if applicable via the secure shared memory 323, to the monitoring processing 322 the conditional access management policy implemented for a given multimedia content.

This corresponds notably to a CAS application in a context of continuous broadcasting, for example, encrypted televisual content.

In the same way, the monitoring processing 322 at random intervals reads the active or inactive states of the transmission of the outgoing stream from the multimedia output interface 34, and the active or inactive state of the multimedia interface protection.

The monitoring processing 322 verifies whether the digital rights management rules are implemented in accordance with the policy previously transmitted by the DRM/CAS 321.

If a multimedia output interface fails to comply with a conditional access rule, the monitoring processing 322 or the DRM/CAS 321 exercises a punitive action 334 by suspending the transmission of the multimedia data stream on the multimedia output interface.

The punitive action here again includes an action for neutralizing the malicious attack, or nullifying it, according to the capabilities of the TEE 32 or TEEs 3201 and 3202 and, more generally, of the system 300.

Whatever the embodiment, another conceivable protective action may be a reinitialization of the system on chip incorporating the system 300 or part of the system 300.

Thus, it is possible to provide an enhancement of the multimedia output interface protection while executing the commands from the multimedia interface and multimedia output interface protection drivers from the not very secure REE 31.

This avoids having to increase the computing capacity of the TEEs and may be adapted to systems on chip not supporting any protection originally.

Furthermore, the embodiments and implementations described are compatible with future security enhancement standards without having to undergo major modifications.

Moreover it is possible to adapt the solution provided to signals other than a multimedia data stream, for example, to a clock signal of an electronic system.

In the implementation represented in FIG. 4, the signal is at least one clock signal controlled respectively by at least one command 43, and, in a monitoring step 42, the conformity is checked of an operating state of said at least one clock signal 41 with the expected state corresponding to said at least one respective command 43.

Each command 43 includes an effective activation order during a given time range. Thus, if, for example, the checked clock signal 41 is in an inactive state at a given instant even though the command orders an activation of the signal at this instant, a malfunction potentially due to a malicious attack is detected.

A punitive action 44 is then exercised against the clock signal or its generation, which may, for example, be a reinitialization of the system on chip implementing this implementation.

Such an implementation may be achieved by a monitoring processing located in a physically secure element SE, comprising, for example, an independent and physically secure clock signal generator.

The operating states of said at least one clock signal may be read in a secure memory shared between the means receiving said at least one clock signal and the monitoring process. The commands may be read in a status register of a clock signal management process.

What is claimed is:

1. A method of protecting a signal against an attack, comprising:
   monitoring to check conformity of an actual state of the signal with an expected state,
   wherein the signal includes an outgoing multimedia data stream delivered at an end of a decryption of an incoming encrypted data stream and an application of a multimedia interface protection,
   wherein the actual state of the signal comprises an active or inactive state of the delivery of the outgoing multimedia data stream, and
   if the actual state of the signal is not in conformity with the expected state, then applying a protective action on said signal so as to neutralize or nullify said attack.

2. The method according to claim 1, wherein applying the protective action comprises stopping the decryption of the incoming encrypted data stream.

3. The method according to claim 1, wherein applying the protective action comprises stopping the delivery of the outgoing multimedia data stream.

4. The method according to claim 1, wherein the multimedia interface protection includes one or more of: digital or analog video output protection, digital or analog audio output protection, digital watermarking, and digital transcoding protection.

5. A computer program product directly stored into a memory of a computer system, including portions of software code for executing a method of protection when said software code is executed on said computer system, said method of protection comprising the steps of: monitoring to check conformity of an actual state of a signal with an expected state, wherein the signal includes an outgoing multimedia data stream delivered at an end of a decryption of an incoming encrypted data stream and an application of a multimedia interface protection, wherein the actual state of the signal comprises an active or inactive state of the delivery of the outgoing multimedia data stream, and if the actual state of the signal is not in conformity with the expected state, then applying a protective action on said signal so as to neutralize or nullify an attack.

6. A physical, non-transitory medium readable by a computer system having instructions executable by computer suitable for causing execution by the computer system of a method of protection, comprising:
   monitoring to check conformity of an actual state of a signal with an expected state,
   wherein the signal includes an outgoing multimedia data stream delivered at an end of a decryption of an incoming encrypted data stream and an application of a multimedia interface protection, wherein the actual state of the signal comprises an active or inactive state of the delivery of the outgoing multimedia data stream, and if the actual state of the signal is not in conformity with the expected state, then applying a protective action on said signal so as to neutralize or nullify an attack.

7. A device for protecting a signal against an attack, comprising:

a multimedia output interface configured to deliver a signal in a multimedia interface format, an enhancement process configured to check conformity of an actual state of the signal with respect to an expected state, and a protection circuit configured to apply a multimedia interface protection on said signal, wherein said enhancement process is configured to check the conformity of the actual state of the multimedia interface protection with an active expected state of said protection, wherein the enhancement process is further configured to check an active or inactive state of the delivery of the signal and to exercise a protective action on said signal if the actual state of the signal is not in conformity with the expected state so as to neutralize or nullify said attack.

8. The device according to claim 7, further comprising a decryption process configured to decrypt an incoming encrypted data stream, wherein the protective action includes stopping the decryption of the incoming encrypted data stream.

9. The device according to claim 7, wherein the protective action includes stopping delivery of said signal.

10. The device according to claim 7, wherein the enhancement process is configured to read the active or inactive state of the multimedia interface protection in a status register of the protection circuit.

11. The device according to claim 7, wherein said active or inactive state of the delivery of the signal is read in a status register of the multimedia output interface.

12. The device according to claim 7, wherein the protection circuit is configured to apply one of: digital or analog video output protection, digital or analog audio output protection, digital watermarking and digital transcoding protection.

13. The device according to claim 7, wherein the enhancement process is incorporated into at least one secure area of at least one microprocessor.

14. The device according to claim 7 implemented in a multimedia reader system capable of reading a multimedia data stream.

15. The device according to claim 14 wherein the multimedia reader system forms or is included in one of: a television decoder, a personal computer, a mobile phone, or a tablet.

* * * * *